(No Model.)
C. A. BARRETT.
STREET CAR GUARD.
No. 523,507. Patented July 24, 1894.
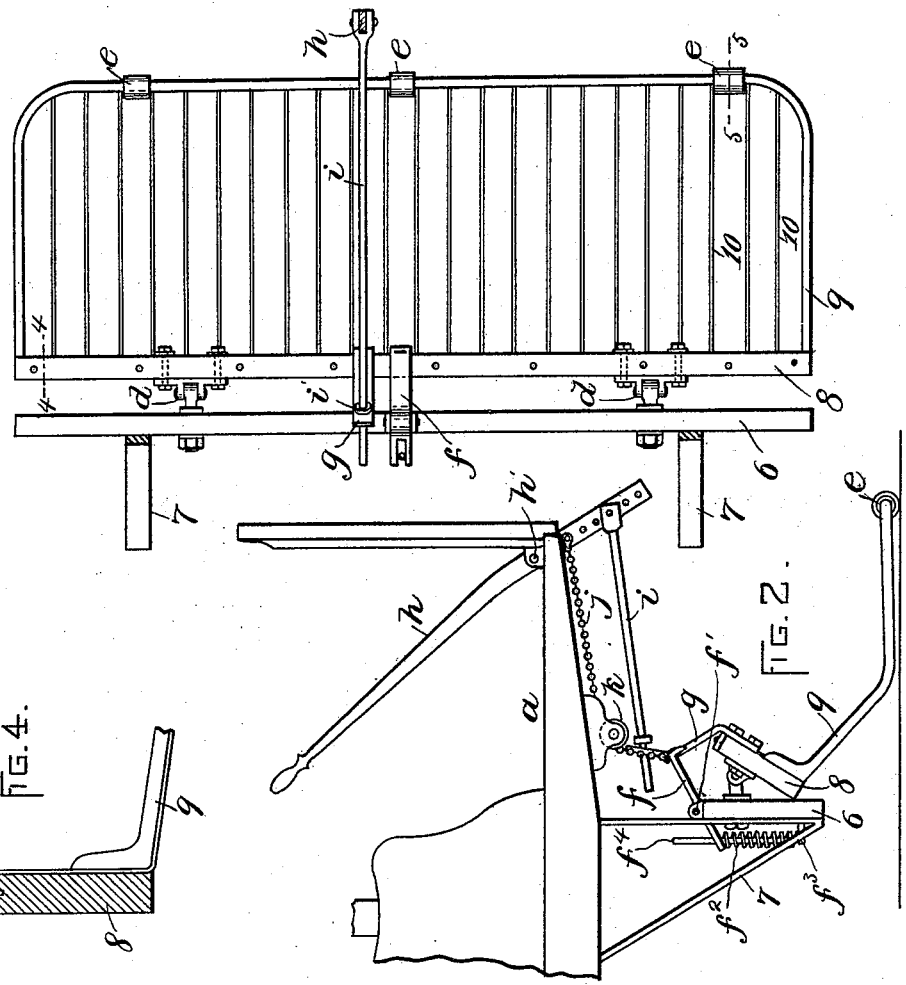
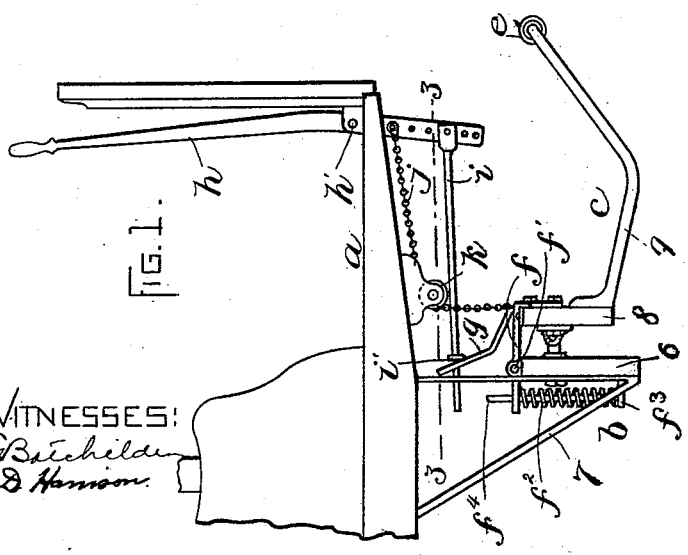
WITNESSES:
INVENTOR:
C. A. Barrett

UNITED STATES PATENT OFFICE.

CHARLES A. BARRETT, OF MALDEN, MASSACHUSETTS.

STREET-CAR GUARD.

SPECIFICATION forming part of Letters Patent No. 523,507, dated July 24, 1894.

Application filed April 27, 1894. Serial No. 509,229. (No model.)

*To all whom it may concern:*

Be it known that I, CHARLES A. BARRETT, of Malden, in the county of Middlesex and State of Massachusetts, have invented certain new and useful Improvements in Street-Car Guards, of which the following is a specification.

This invention has for its object to provide a guard for street-cars adapted to be supported in a raised position when its use is not required, and to be quickly thrown into operative position upon the track in case of emergency. The invention consists in the improvements which I will now proceed to describe and claim.

Of the accompanying drawings, forming part of this specification,—Figure 1 represents a side elevation of a part of a street-car having my improved guard, the guard being raised. Fig. 2 represents a similar view, showing the guard lowered. Fig. 3 represents a plan view of the parts below the line 3—3 of Fig. 1. Fig. 4 represents a section on line 4—4 of Fig. 3. Fig. 5 represents a section on line 5—5 of Fig. 3.

The same letters and numerals of reference indicate the same parts in all the figures.

In the drawings—$a$ represents a car platform, and $b$ represents an attachment affixed to the platform and comprising a bar 6 extending horizontally across the platform, and brackets 7 7 which secure said bar to the platform.

$c$ represents a guard, which as here shown comprises a marginal frame composed of a back-piece or bar 8 which is, or may be, of wood; and a bent metal bar 9 attached at its ends to the bar 8; and rods 10 crossing the space surrounded by the frame, the whole forming a light and strong grated platform. I prefer to attach the ends of the bar 9 to the bar 8, as shown in Fig. 4, the ends of the bar 9 being bent upwardly and affixed to the top of the bar 8. I do not limit myself to this construction of the guard, and may make the same of any other desired form and construction.

The guard is connected by hinges $d\ d$ with the attachment $b$, the members of said hinges being attached preferably to the bars 6 and 8. The hinges permit the guard to swing vertically, so that it can be raised from the track, as shown in Fig. 1, or lowered to or in close proximity with the track, as shown in Fig. 2, the guard being preferably provided with trucks or rollers $e\ e$ arranged to run on the track when the guard is lowered.

$f$ represents a latch which is pivoted at $f'$ to the bar 6, and is normally held by a spring $f^2$ in position to automatically engage the bar 8 of the guard and hold the latter in a raised position, said spring being supported by a bracket $f^3$ and held in place laterally by a rod $f^4$.

$g$ represents an arm which projects upwardly from the bar 8, and is rigidly attached thereto, said arm being intended to co-operate, as hereinafter described, with an operating device whereby the guard is raised. Said operating device, as here shown, consists of a lever $h$ pivoted at $h'$ to the platform $a$ and having a bent lower end, and a rod $i'$ pivoted to the lower end of said lever and passing at its rear portion through a slot in the upper part of the arm $g$. Said rod has a collar or shoulder $i'$ which bears on the front side of the arm $g$.

$j$ represents a chain, which connects the lever $h$ with the latch $f$, said chain passing over a pulley $k$ on the platform.

It will be seen that when the lever $h$ is moved to the position shown in Fig. 1, its rod $i$, acting through the shoulder $i'$ on the arm $g$, raises the guard from its operative position. When the guard is so raised, it is engaged and held by the latch.

When the operator desires to depress the guard, he throws the lever back, thus raising the latch and moving the rod $i$ forward, so that the guard is unobstructed, and drops quickly to its operative position.

The described construction is simple and effective, and the device is not liable to become easily deranged. The guard is compact in form, and can be readily accommodated in the space existing under the platform.

I claim—

1. In a street-car, the combination of a guard hinged to an attachment on the car, a latch adapted to engage the guard above its pivotal center and hold it in a raised position, and a latch displacing or tripping device extending to a position to be operated from on board the car, whereby the guard may be released and allowed to drop to operative position, as set forth.

2. In a street-car, the combination of a guard hinged to an attachment on the car, a lifting device whereby the guard may be raised, a latch which automatically engages the guard and holds it in its raised position, a lever above the car platform, and connections between said lever and latch as set forth.

3. In a street-car, the combination of a guard hinged to an attachment on the car, a latch adapted to positively and automatically engage the guard when the latter is raised, a lever connected with the platform, and connections between said lever and the guard and latch, whereby when the lever is moved in one direction the guard is positively raised by said lever and when the lever is moved in the opposite direction the latch is tripped to release the guard, as set forth.

4. In a street-car, the combination of a guard hinged to an attachment on the car and provided with an upwardly projecting arm, a spring-pressed latch pivoted to an attachment on the car and adapted to engage and hold the guard when the latter is raised, a lever pivoted to the platform, a rod connected with the lever and engaged with the arm on the guard, to raise the latter and a chain or cord connecting said lever with the latch, as set forth.

In testimony whereof I have signed my name to this specification, in the presence of two subscribing witnesses, this 21st day of April, A. D. 1894.

CHARLES A. BARRETT.

Witnesses:
C. F. BROWN,
A. D. HARRISON.